United States Patent
Chemisky et al.

(10) Patent No.: US 10,439,495 B2
(45) Date of Patent: Oct. 8, 2019

(54) REGULATING VOLTAGE SUPPLIED TO A LOAD USING SWITCHING UNITS

(71) Applicant: SIEMENS AKTIENGESELLSCHAFT, Munich (DE)

(72) Inventors: Eric Chemisky, Soultz sous Forets (FR); Joachim Siegrist, Ettlingen (DE); Sornam Viswanathan Venkateswaran, Bangalore (IN); Anand Venkatramani, Bangalore (IN)

(73) Assignee: Siemens Aktiengesellschaft, München (DE)

( * ) Notice: Subject to any disclaimer, the term of this patent is extended or adjusted under 35 U.S.C. 154(b) by 171 days.

(21) Appl. No.: 15/548,242

(22) PCT Filed: Feb. 3, 2015

(86) PCT No.: PCT/IB2015/000105
§ 371 (c)(1),
(2) Date: Aug. 2, 2017

(87) PCT Pub. No.: WO2016/124955
PCT Pub. Date: Aug. 11, 2016

(65) Prior Publication Data
US 2018/0019675 A1  Jan. 18, 2018

(51) Int. Cl.
*G09G 5/00* (2006.01)
*H02M 3/158* (2006.01)
(Continued)

(52) U.S. Cl.
CPC ......... *H02M 3/1582* (2013.01); *G09G 3/36* (2013.01); *H02M 1/00* (2013.01); *H02M 3/155* (2013.01);
(Continued)

(58) Field of Classification Search
CPC ...... H02M 3/1582; H02M 1/00; H02M 3/155; H02M 2001/0022; H02M 2001/007; G09G 3/36; G09G 2330/021
See application file for complete search history.

(56) References Cited

U.S. PATENT DOCUMENTS

| | | | |
|---|---|---|---|
| 2010/0052569 A1* | 3/2010 | Hoogzaad | H05B 33/0818 315/294 |
| 2011/0068713 A1* | 3/2011 | Hoogzaad | H05B 33/0815 315/307 |
| 2013/0009470 A1 | 1/2013 | Chen et al. | |

FOREIGN PATENT DOCUMENTS

| | | |
|---|---|---|
| CN | 1701482 A | 11/2005 |
| CN | 103001511 A | 3/2013 |

(Continued)

OTHER PUBLICATIONS

PCT International Search Report and Written Opinion of the International Searching Authority dated Dec. 11, 2015 for corresponding PCT/IB2015/000105.

*Primary Examiner* — Adam R. Giesy
(74) *Attorney, Agent, or Firm* — Lempia Summerfield Katz LLC

(57) ABSTRACT

Methods and electronic devices are disclosed for supplying a load with an input voltage including determining a level of a supply voltage. The method includes enabling a voltage step-down unit while disabling a voltage step-up unit when the supply voltage exceeds a first threshold voltage. The method includes enabling a voltage step-up unit while disabling a voltage step-down unit when the supply voltage is below a second threshold voltage. The electronic device includes a voltage step-up unit for stepping up the supply voltage below a first threshold, a voltage step-down unit for stepping down the supply voltage above a second threshold, and a switching unit coupled to the voltage step-up unit and (Continued)

the voltage step-down unit. The switching unit is configured to at least one of enable and bypass at least one of the voltage step-down unit and the voltage step-up unit based on the level of the supply voltage.

15 Claims, 3 Drawing Sheets

(51) Int. Cl.
  *H02M 3/155* (2006.01)
  *G09G 3/36* (2006.01)
  *H02M 1/00* (2006.01)
(52) U.S. Cl.
  CPC . *G09G 2330/021* (2013.01); *H02M 2001/007* (2013.01); *H02M 2001/0022* (2013.01)

(56) References Cited

FOREIGN PATENT DOCUMENTS

| | | | |
|---|---|---|---|
| JP | H01157265 A | | 6/1989 |
| JP | H01157265A A | | 6/1989 |
| JP | 2013192297 A | | 9/2013 |
| JP | 2013192297 A | | 9/2013 |

\* cited by examiner

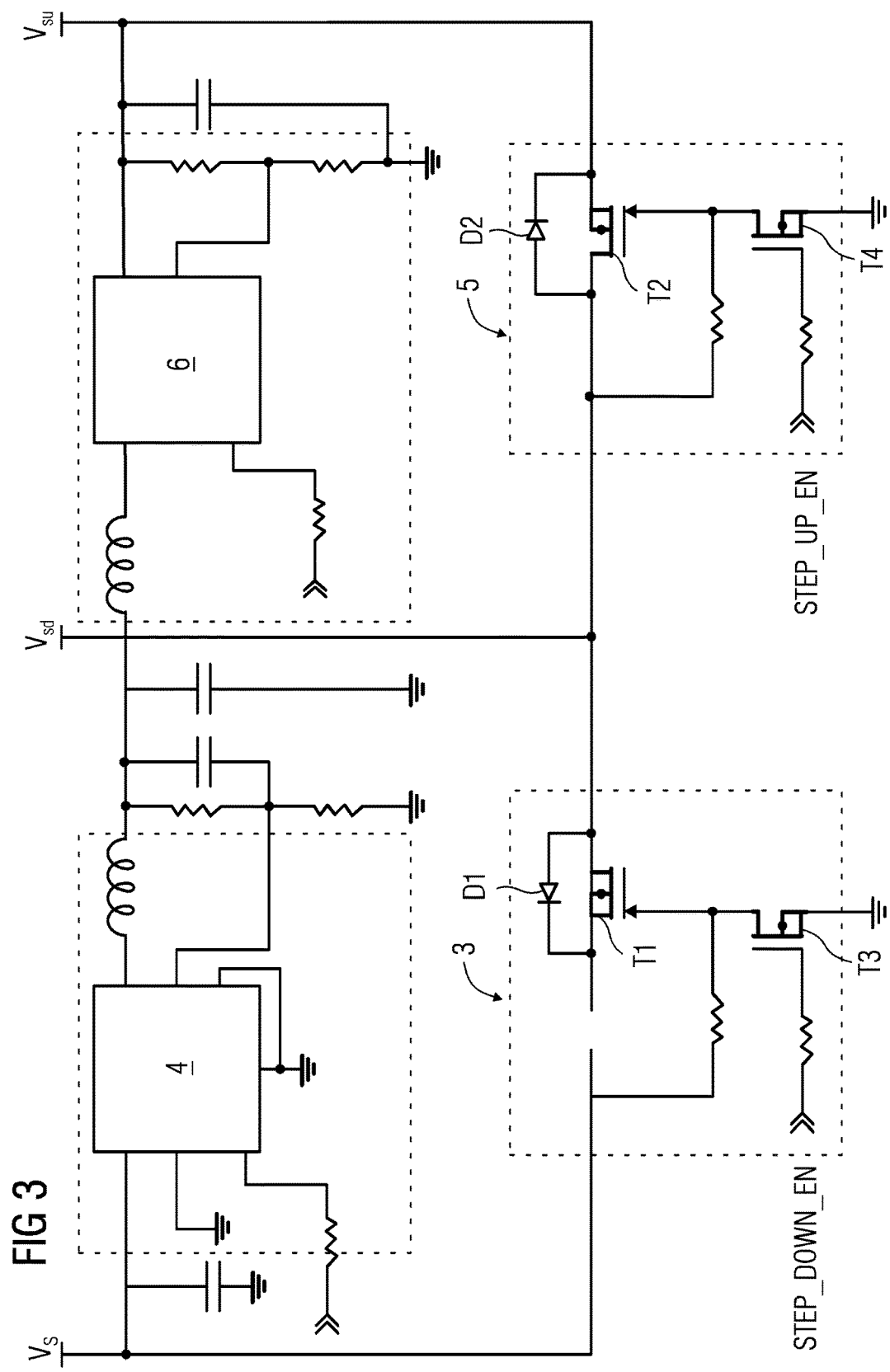

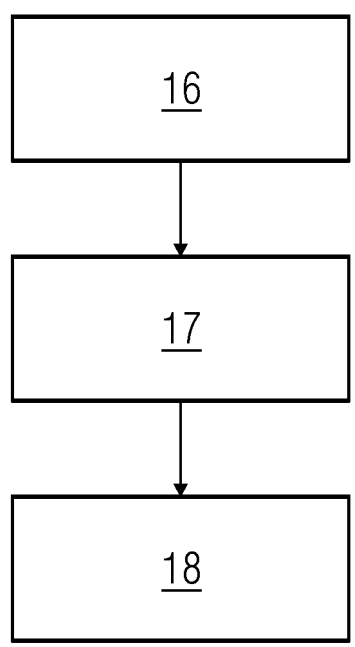

REGULATING VOLTAGE SUPPLIED TO A LOAD USING SWITCHING UNITS

The present patent document is a § 371 nationalization of PCT Application Serial Number PCT/IB2015/000105, filed Feb. 3, 2015, designating the United States, which is hereby incorporated by reference.

TECHNICAL FIELD

This disclosure relates to a method and an electronic device for supplying a load associated with a field device using bypass switching units.

BACKGROUND

A certain class of low power electronic devices may be used in the industry for measuring physical process values such as pressure, temperature, flow, and levels. An example of such electronic control device may be a process transmitter, also known as a field device. The field devices are frequently used for process instrumentation, which are used for instance to detect and/or influence process variables. The field devices are connected to one another by an automation network for the purpose of exchanging data. Field devices, which detect a physical or chemical variable as a process variable, convert a relevant variable into a measured value and output this measured valve to a central control station for further processing. Examples of measuring transducers of this type are measuring transducers for fill level, mass flow rate, pressure, temperature, pH value, conductivity, etc. Such low power electronic devices may include a display unit (e.g., Liquid Crystal Display (LCD)), a processing unit, a communication unit, and an input unit. Such electronic devices may contain an analog frontend including the sensors/transducers and a transmitter system, which is dedicated to the communication with the central control station. The communication may be performed in an analog mode (e.g., 4-20 mA) or a digital mode. The communication may be carried over bus systems such as ProfiBus, HART, Fieldbus foundation, and the like.

The display unit of such electronic devices may include a Graphics Liquid Crystal Display (GLCD), a plurality of backlight LEDs, and associated enabling circuitry. The GLCD includes a number of pixels configured to display alphanumeric characters. The display unit is powered by the transmitter board of the electronic device itself. Due to the various standards for process transmitters, the power and voltage supplied from the transmitter board are limited to small values.

The GLCD and the backlight LEDs of the display unit of such process transmitters consume a majority of the total allocated power for the field device. Therefore, the remaining functions of the field device, which includes power supply and logic circuitry, need to be optimized to consume remaining power. The GLCD consumes minimum power when operated at an optimum voltage level. The electronic devices may be powered by a variable supply, for example, a current loop (which also serves for signaling purposes). It is therefore important to regulate the supply provided to the display unit to the optimum voltage level. Therefore, there is a need for regulating the supply voltage to the particular voltage level in order to power the display unit, which includes the GLCD.

Currently, off-the-shelf voltage step-down and voltage step-up (e.g., buck-boost) converters may be configured to provide a constant output by processing supply voltages fluctuating between a range. An exemplary buck-boost converter may be TPS63036 manufactured by Texas instruments. The efficiency of TPS63036 is low for certain voltage ranges.

SUMMARY AND DESCRIPTION

The scope of the present disclosure is defined solely by the appended claims and is not affected to any degree by the statements within this summary. The present embodiments may obviate one or more of the drawbacks or limitations in the related art.

Thus, the object is to increase the efficiency of the buck-boost converter while operating the GLCD at an optimum voltage.

Accordingly, it is an object to provide an efficient method and an electronic device for powering a load where the supply voltage is variable. The objective is achieved by using a switching unit for bypassing individual step-up unit and step-down unit for providing a constant voltage to the load.

The object is achieved by providing a method and an electronic device for supplying a load with an input voltage including determining a level of a supply voltage. Further, the method includes enabling a voltage step down unit while bypassing a voltage step-up unit, using a switching unit, when the supply voltage exceeds a first threshold voltage. The method also includes enabling a voltage step-up unit while disabling a voltage step-down unit, using a switching unit, when the supply voltage is below a second threshold voltage.

In an aspect, the at least one switching unit is configured to offer a low resistance path to a supply current in order to bypass at least one of the voltage step-up unit and a voltage step-down unit.

In another aspect, the input voltage to the load is held substantially constant.

In yet another aspect, one of the voltage step-down unit and the voltage step-up unit is operational at a time instant.

In still yet another aspect, the at least one switching unit includes a configuration for preventing current flow through parasitic body diodes associated with the switching units.

In yet another aspect, the first threshold voltage is greater than the second threshold voltage.

The disclosure further provides an electronic device for supplying a load with an input voltage. The electronic device includes a voltage supply unit configured to determine a level of a supply voltage. The electronic device includes a voltage step-up unit, for stepping up an input voltage below a first threshold value and a voltage step-down unit, for stepping down an input voltage above a second threshold. The electronic device further includes at least one switching unit coupled to the voltage step-up unit and the voltage step-down unit. The switching unit is configured to bypass at least one of the voltage step-up unit and the voltage step-down unit based on the level of the input voltage.

In an embodiment, a switching unit is coupled in parallel with the voltage step-up unit, wherein the switching unit, when active, provides an alternative path for a supply current thereby bypassing the voltage step-up unit.

In another embodiment, a switching unit is coupled in parallel with the voltage step-down unit, wherein the switching unit, when active, provides an alternative path for the supply current thereby bypassing the voltage step-down unit.

In yet another embodiment, the voltage step-down unit is active when the supply voltage is above the first threshold value, while the voltage step-up unit is bypassed by the switching unit.

In still yet another embodiment, the voltage step-up unit is active when the supply voltage is below a second threshold value, while the voltage step-down unit is bypassed by the switching unit.

In a further embodiment, the electronic device includes a parasitic body diode in an anti-parallel configuration that prevents a flow of current through the parasitic body diode during the operation of the electronic device.

In accordance with one embodiment, the voltage step-down unit and the voltage step-up unit are DC-DC converters.

In accordance with a further embodiment, the load is a Graphics Liquid Crystal Display (GLCD) configured to operate at a constant voltage.

BRIEF DESCRIPTION OF THE DRAWINGS

The above mentioned and other features of the disclosure will now be addressed with reference to illustrated embodiments shown in the accompanying drawings, in which:

FIG. 3 illustrates an exemplary configuration of the electronic device, in accordance with an embodiment.

FIG. 4 illustrates exemplary method acts involved in providing an input voltage to a load, in accordance with an embodiment.

Figure 1:
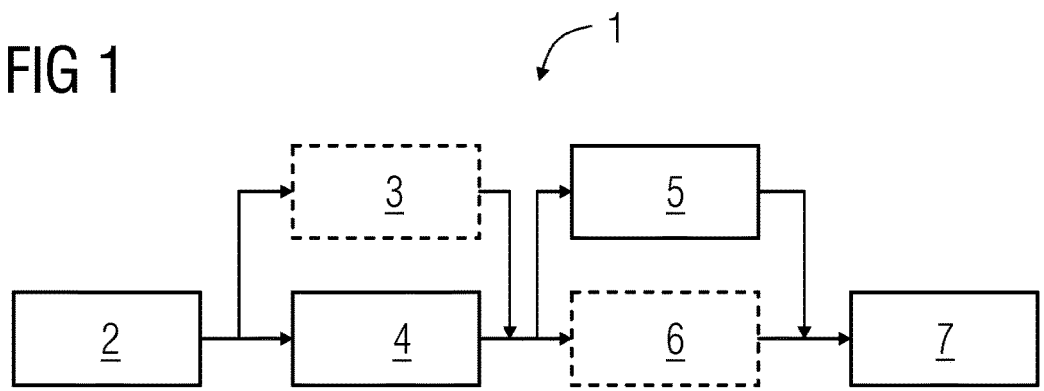
FIG. 1 illustrates an exemplary block diagram of a first mode of operation of the electronic device, in accordance with an embodiment.

Various embodiments are described with reference to the drawings, wherein like reference numerals are used to refer like elements throughout. In the following description, for the purpose of explanation, numerous specific details are set forth in order to provide thorough understanding of one or more embodiments. It may be evident that such embodiments may be practiced without these specific details.

DETAILED DESCRIPTION

The electronic device disclosed below includes a current supply unit, a voltage step-up unit, a voltage step-down unit, and the load. The supply voltage is the voltage received by the electronic device from a source, such as a current loop. The supply voltage ($V_s$) may vary between a certain voltage range. The supply voltage needs to be maintained at a constant level to power the load. In an embodiment, the load is a graphics Liquid Crystal Display (GLCD). In field devices, the GLCD may function optimally at a particular voltage, for example 3V. Therefore, the electronic device needs to provide a constant input voltage ($V_i$) of 3V to the GLCD unit.

FIG. 1 illustrates an exemplary block diagram of a first mode of operation of the electronic device, in accordance with an embodiment. The electronic device includes a voltage supply unit 2 (not shown), voltage step-down unit 4, a switching unit 3, a voltage step-up unit 6, a switching unit 5, and a load 7. The switching unit 3 is coupled in parallel with the voltage step-down unit 4. The switching unit 5 is coupled in parallel with the voltage step-up unit 6. In the first mode of operation, the supply voltage is in the range of V1 to V2, e.g., $3<V_s<6$. In this case, the voltage step-down unit 4 is activated while bypassing the voltage step-up unit 6. In the first mode, the electronic device is configured to enable the voltage step-down unit 4 and disable the voltage step-up unit 6. For the voltage range in the first mode, the switching unit 3 is disabled and the switching unit 5 is enabled. When enabled, the switching unit 5 provides an easier path for the current, as a result, by passes the voltage step-up unit. Therefore, a constant input voltage of $V_i$ is supplied to the load 7.

Figure 2:
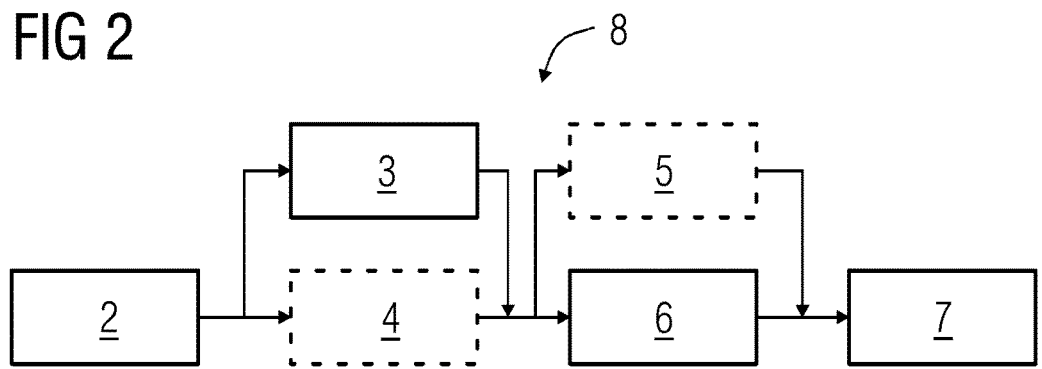
FIG. 2 illustrates an exemplary block diagram of the second mode of operation of the electronic device, in accordance with an embodiment.

FIG. 2 illustrates an exemplary block diagram of a second mode of operation of the electronic device, in accordance with an embodiment. In the second mode, the supply voltage $V_s$ is in the range of V3 to V4. For example, the exemplary voltage range may be 1V-3V. For this range of the supply voltage, the voltage step-up unit is enabled whereas the voltage step-down unit is disabled. The switching unit 3 is enabled to provide an alternative path for current thereby by passing the voltage step-down unit. On the other hand, the switching unit 5 is disabled thereby enabling the voltage step-up unit 6. The voltage step-up unit 6 regulates the supply voltage to a value of $V_i$, which is provided as input voltage to the load 7.

FIG. 3 illustrates an exemplary configuration of the electronic device, in accordance with an embodiment. The electronic device includes the voltage step-down unit 4, switching unit 5, the voltage step-up unit 6, and the load 7. It can be seen in FIG. 3, that the voltage step-down unit 4 and the voltage step-up unit 6 include the necessary circuitry including inductors, resistors, and capacitors. The voltage step-down unit 4 and the voltage step-up unit 6 are DC-DC converters. In an embodiment, the voltage step-down unit 4 is a buck converter and the voltage step-up unit 6 is a boost converter. The switching unit 3 is in parallel configuration with voltage step-down unit 4. Similarly, the switching unit 5 is in parallel configuration with the voltage step-up unit 6. The components such as, the voltage step-up unit and the voltage step-down unit, used in the electronic device depicted in FIG. 3 may be off-the-shelf components.

In FIG. 3, the switching unit 5 includes a MOSFET T1. The source terminal of T1 is connected to the voltage supply Vs. the gate terminal of T1 is connected to the drain terminal of an enabling MOSFET T3. The gate terminal of the enabling MOSFET T3 receives a control signal that controls the operation of the switching unit 3. The control signal may be at least one of logic 'HIGH' and logic 'LOW' signal. Further, the drain terminal of T1 is coupled to the output of the voltage step-down controller. The MOSFET T1 includes a parasitic body diode D1 exists between the source and drain terminals of T1. The MOSFET T1 is coupled to the voltage step-down unit 4 in such a way that the current does not pass through the parasitic body diode D1.

The switching unit 5 includes a MOSFET T2. The drain terminal of T2 is coupled to the output of the voltage step-down unit 4. The source terminal of T2 is coupled to the output of the voltage step-up unit 6. The gate terminal of T2 is coupled with a drain terminal of an enabling MOSFET T4. The gate terminal of the enabling MOSFET T4 receives a control signal, a logic 'HIGH' or a logic 'LOW' signal, from a control circuit. In an embodiment, the switching unit 3 and the switching unit 5 are similar. A parasitic body diode D2 exists between the source and drain terminals of T2. The parasitic body diode D2 of the MOSFET T2 is coupled in an anti-parallel configuration the voltage step-up unit 6. The MOSFET T2 in a coupled with the voltage step-up unit in a configuration to prevent a current from flowing through the parasitic body diode D2 associated with the MOSFET T2.

As illustrated in FIG. 3, the switching unit 3 and the switching unit 5 include a configuration of electronic switches, resistors, and diodes. In an embodiment, the electronic switches may include Metal Oxide Semiconductor Field Effect Transistors (MOSFETs). As depicted in FIG. 3, the switching unit 3 and the switching unit 5 include a diode in an anti-parallel configuration with respect to MOSFETS T1 and T2. The parasitic body diode D1 of MOSFET T1 is in anti-parallel configuration with the voltage step-down unit 4. Similarly, parasitic body diode D2 of MOSFET T2 is in anti-parallel configuration with the voltage step-up unit 6. The MOSFETs T1 and T2 are arranged so as to prevent the current from passing through the parasitic body diodes D1 and D2, thereby eliminating leakage current flow from the load 7 (GLCD) to the power supply unit 2 and improving the efficiency of the electronic device. The parasitic body diodes D1 and D2 are inherent to any MOSFET, which is well known for a person skilled in the art.

In an exemplary embodiment, the electronic device functions as explained below. In the first mode, the source voltage Vs is in the range between 2.6V to 3.6V. In the first mode, the voltage step-down unit 4 is enabled by providing a logic 'LOW' to the gate terminal of the MOSFET T3, thereby turning the MOSFET T3 off. The voltage step-down unit 4 thereafter steps down the supply voltage $V_s$ to 2.6V. At this instance in the operation of the electronic device, the voltage at $V_{SU}$ (depicted in FIG. 3) is lower than the voltage level at $V_s$. The parasitic body diode D2, in anti-parallel configuration with the voltage step-down unit 4, is reverse biased therefore preventing a current flow thorough the parasitic body diode D1.

Further, in the first mode the voltage step-up unit 6 is disabled by providing a control signal STEP_UP_BYPASS as logic 'HIGH' at the gate terminal of MOSFET T4, which turns on MOSFET T4. The gate terminal of the MOSFET T2 is pulled low thereby turning on T2. When turned on, the MOSFET T2 has a lower resistance as compared to the diode D2 hence diverting the current to the ground, as a result bypassing the voltage step-up unit 6.

In the second mode of operation, the supply voltage $V_s$ is between V3 and V4. In the second mode, the gate terminal of MOSFET T2 is provided with a control signal STEP_UP_BYPASS to the gate terminal of the MOSFET T4. The control signal STEP_UP_BYPASS is held at a logic 'LOW'. As a result, the MOSFET T4 turns off thereby enabling the voltage step-up unit 6. Thereafter, supply voltage $V_s$ is stepped up to $V_i$. The voltage level at $V_{SU}$ is higher than that of $V_S$. As a result, the parasitic body diode D2 is reverse biased and prevents the current from flowing through D2.

In the second mode, the control signal STEP_DOWN_BYPASS, at the gate terminal of MOSFET T3, is pulled to a logic 'HIGH'. As a result, the MOSFET T3 is enabled, which turns on the MOSFET T1. When turned on, the MOSFET T1 offers a lower resistance as compared to the parasitic body diode D1 hence diverting the current to the ground, as a result bypasses the voltage step-down unit 4.

FIG. 4 illustrates exemplary method acts 15 involved in providing a constant input voltage to a load, in accordance with an embodiment. At act 16, a level of a supply voltage is determined by the electronic device. The component may include, for example, a comparator. At act 17, a voltage step down unit is enabled while disabling a voltage step-up unit, using a switching unit, when the supply voltage exceeds a first threshold voltage. In an embodiment, the first threshold voltage is between 1V to 3V. When the supply voltage $V_S$ is between 3V to 6V, it is necessary to regulate the input voltage to the load to 3V. Therefore, a voltage step-down unit 4 is enabled while disabling the voltage step-up unit 6. The switching unit 3 is used to bypass the voltage step-up unit 6. The switching unit is activated based on the supply voltage level.

At act 18, a voltage step-up unit 6 is enabled while disabling a voltage step-down unit 4, using a switching unit, when the supply voltage is below a second threshold voltage. In an embodiment, the second voltage level is between 3V to 6V. In this case, the supply voltage is stepped up by the voltage step-up unit 6. The voltage step-down unit 4 is disabled by enabling the switching unit. The switching unit is enabled based on the voltage level that is determined.

The method and system described are implemented and tested using Failure Modes Effects and Diagnostic Analysis (FMEDA) techniques. Further, the electronic device is configured to eliminate the interference caused by parasitic body diodes. The implementation of the electronic device is easy and economical as the components are readily available.

While the present disclosure has been described in detail with reference to certain embodiments, it may be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

We claim:

1. A method for supplying a load with an input voltage, the method comprising:
   determining a level of a supply voltage;
   enabling a voltage step down unit while disabling a voltage step-up unit, wherein the voltage step-up unit is disabled using a first switching unit, when the supply voltage exceeds a first threshold voltage; and
   enabling the voltage step-up unit while disabling the voltage step-down unit, wherein the voltage step-down unit is disabled using a second switching unit, when the supply voltage is below a second threshold voltage,
   wherein the first switching unit and the second switching unit include a configuration for preventing current flow through parasitic body diodes associated with the first switching unit and the second switching unit.

2. The method of claim 1, wherein the first switching unit and the second switching unit are configured to offer a low resistance path to a supply current in order to bypass the voltage step-down unit, the voltage step-up unit, or both the voltage step-down unit and the voltage step-up unit.

3. The method of claim 2, wherein the first threshold voltage is greater than the second threshold voltage.

4. The method of claim 1, wherein the first switching unit and the second switching unit are enabled by control signals.

5. The method of claim 1, wherein the voltage step-down unit is operational at a time instant.

6. The method of claim 1, wherein the first threshold voltage is greater than the second threshold voltage.

7. The method of claim 1, wherein the voltage step-up unit is operational at a time instant.

8. An electronic device for supplying a load with an input voltage, the electronic device comprising:
   a voltage supply unit;
   a voltage step-up unit configured to step up a supply voltage below a first threshold voltage;
   a voltage step-down unit configured to step down the supply voltage above a second threshold voltage; and
   at least one switching unit coupled to the voltage step-up unit and the voltage step-down unit, wherein the at least one switching unit is configured to enable, bypass, or both enable and bypass at least one of the voltage step-down unit and the voltage step-up unit based on a level of the supply voltage,
   wherein the at least one switching unit comprises parasitic body diodes in an anti-parallel configuration with the voltage step-up unit and the voltage step-down unit for preventing leakage current.

9. The electronic device of claim 8, wherein the at least one switching unit is coupled in parallel with the voltage step-down unit,
   wherein the at least one switching unit, when enabled, provides a bypass path for bypassing the voltage step-down unit.

10. The electronic device of claim 8, wherein the at least one switching unit is coupled in parallel with the voltage step-up unit,
   wherein the at least one switching unit, when enabled, provides a bypass path for bypassing the voltage step-up unit.

11. The electronic device of claim 10, wherein the voltage step-up unit is enabled when the supply voltage is below a second threshold voltage, while the voltage step-down unit is bypassed by enabling the at least one switching unit.

12. The electronic device of claim 8, wherein the voltage step-down unit is enabled when the supply voltage is above a first threshold voltage, while the voltage step-up unit is bypassed by enabling the at least one switching unit.

13. The electronic device of claim 8, wherein the voltage step-down unit and the voltage step-up unit are DC-DC converters.

14. The electronic device of claim 8, wherein the load is a Graphics Liquid Crystal Display (GLCD) configured to operate at a constant voltage.

15. The electronic device of claim 8, wherein the first threshold voltage is greater than the second threshold voltage.

* * * * *